(12) United States Patent
Song et al.

(10) Patent No.: US 9,036,782 B2
(45) Date of Patent: May 19, 2015

(54) DUAL ENERGY BACKSCATTER X-RAY SHOE SCANNING DEVICE

(75) Inventors: Samuel M. Song, Las Vegas, NV (US); Brian Kauke, North Las Vegas, NV (US); Yoohwan Kim, Henderson, NV (US); Douglas P. Boyd, Las Vegas, NV (US)

(73) Assignee: Telesecurity Sciences, Inc., Las Vegas, NV (US)

( * ) Notice: Subject to any disclaimer, the term of this patent is extended or adjusted under 35 U.S.C. 154(b) by 461 days.

(21) Appl. No.: 13/205,370

(22) Filed: Aug. 8, 2011

(65) Prior Publication Data

US 2012/0069963 A1 Mar. 22, 2012

Related U.S. Application Data

(60) Provisional application No. 61/371,597, filed on Aug. 6, 2010.

(51) Int. Cl.
*G06K 9/00* (2006.01)
*G01N 23/203* (2006.01)
*G01V 5/00* (2006.01)

(52) U.S. Cl.
CPC .......... *G01V 5/0025* (2013.01); *G06K 2209/09* (2013.01)

(58) Field of Classification Search
CPC .......................... G01V 5/0025; G01V 5/0041
USPC ..................................................... 378/87–90
See application file for complete search history.

(56) References Cited

U.S. PATENT DOCUMENTS

| | | | |
|---|---|---|---|
| 6,665,373 B1* | 12/2003 | Kotowski et al. | 378/90 |
| 2006/0011848 A1* | 1/2006 | Rushbrooke et al. | 250/367 |
| 2006/0251209 A1* | 11/2006 | Tkaczyk et al. | 378/5 |
| 2007/0147585 A1* | 6/2007 | Eilbert et al. | 378/57 |
| 2008/0152081 A1* | 6/2008 | Cason | 378/57 |
| 2008/0283761 A1* | 11/2008 | Robinson et al. | 250/370.09 |
| 2008/0303664 A1* | 12/2008 | Huey et al. | 340/552 |
| 2009/0052762 A1* | 2/2009 | Dugan et al. | 382/132 |
| 2009/0123070 A1* | 5/2009 | Xiaoying | 382/176 |
| 2010/0295689 A1* | 11/2010 | Armistead et al. | 340/600 |

\* cited by examiner

*Primary Examiner* — David J Makiya
*Assistant Examiner* — Danielle Fox
(74) *Attorney, Agent, or Firm* — Procopio Cory Hargreaves & Savitch LLP

(57) ABSTRACT

Dual-energy backscatter x-ray shoe scanning including: preprocessing input image information received from a shoe scanning device and image calibration data received from a database to output an atomic number image; detecting at least one suspect region based off the atomic number image; identifying the at least one detected suspect region as an object class using a changeable list of attributes; and classifying the object class according to a changeable list of categories.

9 Claims, 6 Drawing Sheets

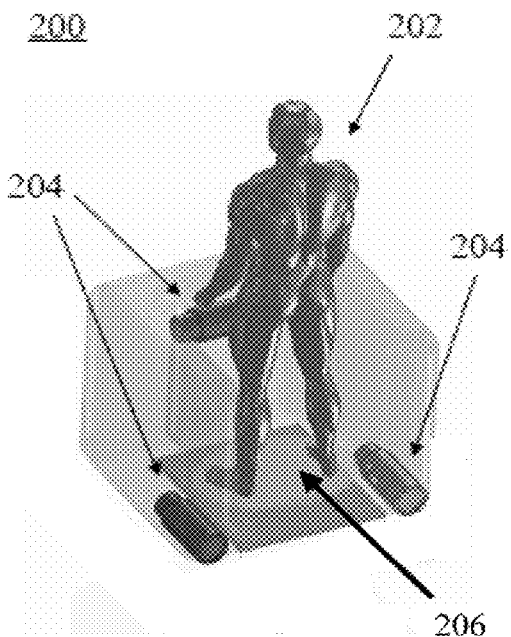
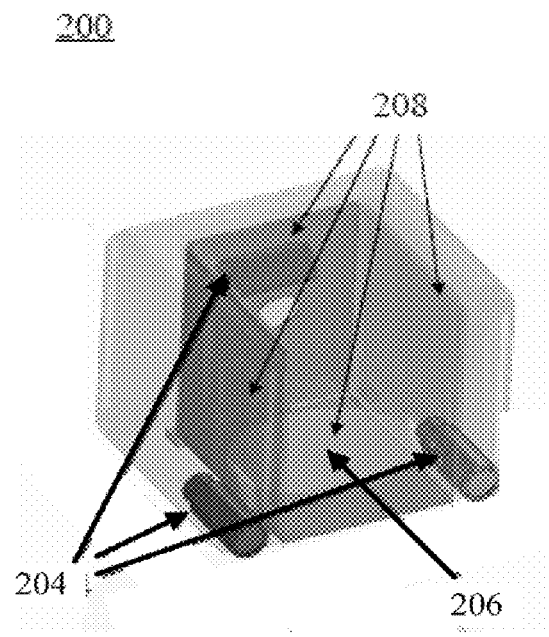
FIG. 2A  FIG. 2B
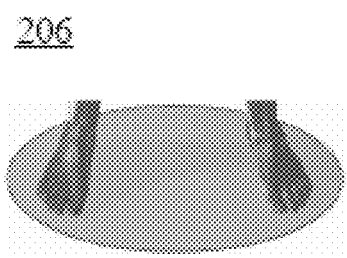
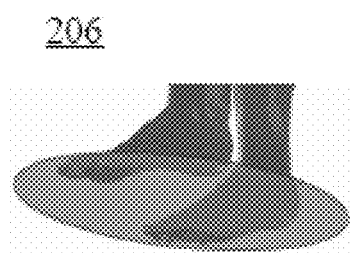
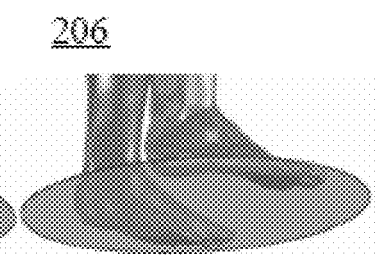
FIG. 2C  FIG. 2D  FIG. 2E

500

DUAL ENERGY BACKSCATTER X-RAY SHOE SCANNING DEVICE

CROSS-REFERENCE TO RELATED APPLICATIONS

This application claims the benefit of priority under 35 U.S.C. §119(e) of U.S. Provisional Patent Application No. 61/371,597, filed Aug. 6, 2010, entitled "DUAL ENERGY BACKSCATTER X-RAY SHOW SCANNER DETECTION SYSTEM." The disclosure of the above-referenced application is incorporated in its entirety herein by reference.

FIELD OF THE INVENTION

The present disclosure generally relates to the field of X-ray imaging technologies, and in particular, to utilizing dual energy backscatter x-ray to scan articles of footwear and to detect the presence of concealed objects and other related threats or anomalies while still being worn by personnel.

BACKGROUND

There have been several scanner systems developed for the purposes of detecting concealed threats and anomalies in footwear, while being worn by passengers. The systems may be based on one or more of the following three techniques: Inductive Loop, Trace Detection and Quadrupole Resonance. The three sensing techniques are based on different physical principles, but possess vulnerable components that can be easily defeated as noted below.

For example, the Inductive Loop technique uses a current loop to detect metallic objects. However, this approach faces the problem that a vast majority of footwear includes metallic parts or posts for stability, which often unnecessarily triggers alarms—a common nuisance.

The Trace Detection technique uses analysis to detect the presence of minute amounts of explosives. However, this approach faces the problem of how the lack of detection does not necessarily guarantee the absence of explosives. State sponsored terrorists, for example, would have access to a clean room where the concealment of explosives inside footwear, and would be capable of concealing explosives without any residue.

The Quadrupole Resonance technique uses material characterization via response to a known radio frequency excitation. This approach has the problem where wrapping the concealment with a sheet of conducting material (e.g., aluminum foil) would essentially shield the concealment from the RF excitation, which in effect hides the concealment from detection.

SUMMARY

Dual energy backscatter x-ray shoe scanning techniques and systems are described herein. Some embodiments are summarized in this section.

Provided is a shoe scanning device, including: at least one x-ray tube oriented towards selected sides of a test subject; at least one detector screen oriented towards the selected sides of a test subject and configured to detect scattered photons from the x-rays emitted by the at least one x-ray tube; a storage unit to store images from detected scattered photons on the at least one detector screen; and a processing unit configured to detect, identify and classify concealed objects in a selected area of the test subject.

Provided is also a computer-implemented method including: pre-processing, via a computing device, input image information received from the shoe scanning device and image calibration data received from a database into an atomic number image; detecting, via the computing device, at least one suspect region based of the atomic number image; identifying, via the computing device, one or more detected suspect region as an object class using a changeable list of attributes; and classifying, via the computing device, the object class according to a changeable list of categories.

Provided is also a system including: a database with image calibration data; a shoe scanning device including at least one x-ray and at least one detector screen; a pre-processing unit to receive and process image data from the shoe scanning device and to receive image calibration data from the database to output an atomic number image; a detection unit to detect one or more suspect region from the atomic number image; an identification unit to identify object class from the one or more suspect region based on a changeable list of attributes and information from the atomic number image; and a classification unit to classify the object class based on a changeable list of categories.

Provided is also a machine-readable medium having stored thereon a set of instructions, which when executed by a machine, perform a method including: pre-processing input image information received from a shoe scanning device and image calibration data received from a database into an atomic number image; detecting one or more suspect regions based of the atomic number image; identifying the detected suspect regions as an object class using a changeable list of attributes; and classifying the object class according to a changeable list of categories.

BRIEF DESCRIPTION OF THE DRAWINGS

The embodiments are illustrated by way of example and not limitation in the figures of the accompanying drawings in which like references indicate like elements.

FIG. 2A illustrates a rendered isometric view picture of the scanner with a test subject, according to an embodiment of the present disclosure.

FIG. 2B illustrates a rendered isometric view picture of the scanner with plastic scintillating detectors, according to an embodiment of the present disclosure.

FIGS. 2C, 2D and 2E illustrate the scanning perspective of the x-ray tubes of the scanner, according to an embodiment of the present disclosure.

DETAILED DESCRIPTION

Figure 1:
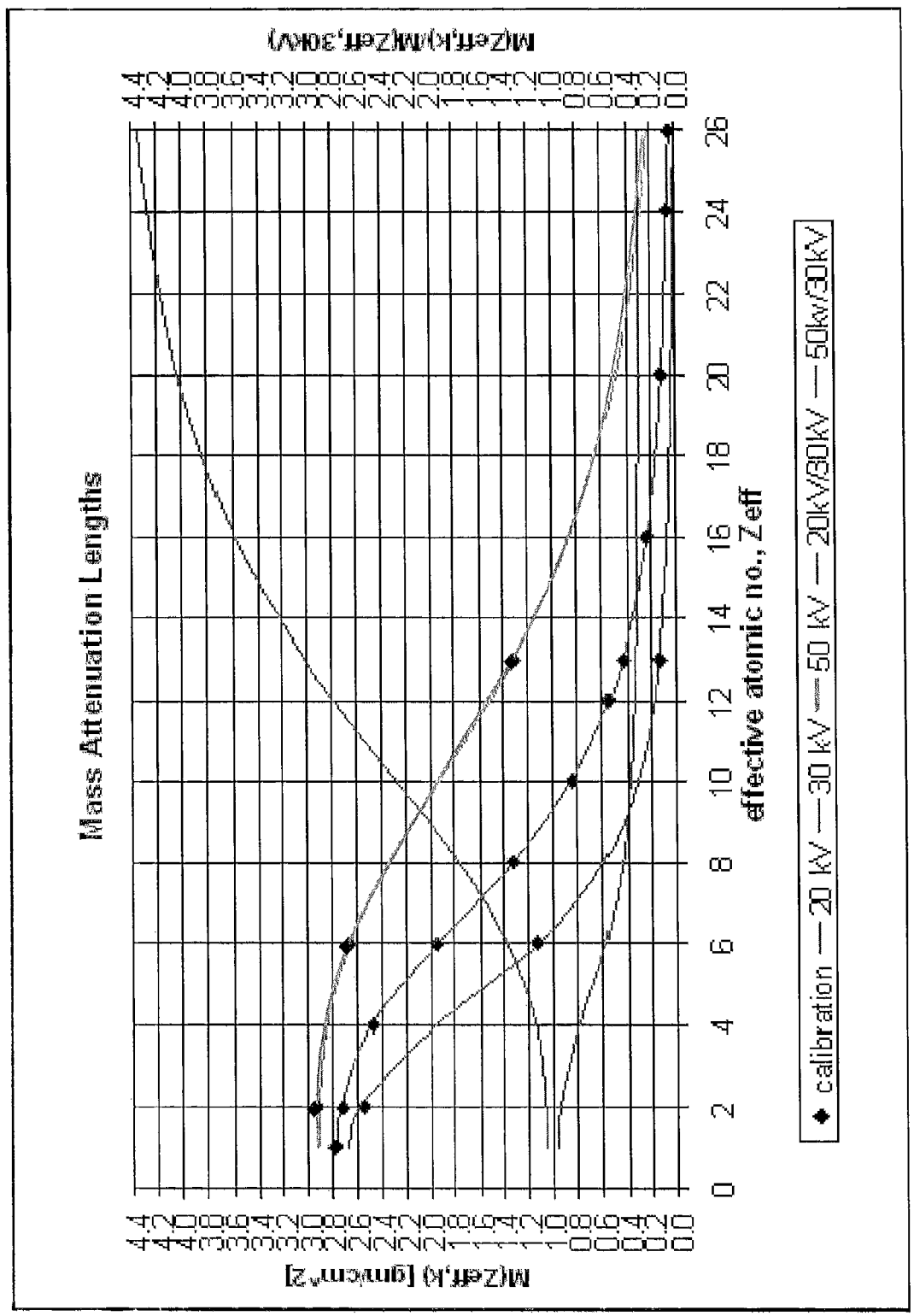
FIG. 1 illustrates mass-attenuation lengths for different X-rays at different effective atomic numbers, according to an embodiment of the present disclosure

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment, and such references mean at least one.

Reference in this specification to "one embodiment" or "an embodiment" or the like means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described that may be exhibited by some embodiments and not by others. Similarly, various requirements are described that may be requirements for some embodiments but not other embodiments.

The present disclosure is directed to systems, apparatuses, methods, techniques, software, and hardware designs for using dual-energy backscatter x-ray to scan shoes. A goal of a scanner system or, for example, a shoe scanning device is to detect threats and anomalies concealed in and about the shoes as worn by personnel passing through a checkpoint. The concealment may be as simple as the placement of a ceramic knife at the bottom of a foot (between the foot and the shoes) or as complex as a bulk plastic explosive inlaid into the sole of the footwear.

A goal is to recognize the need for scanner systems that shall effectively and reliably detect a wide variety of military, commercial, and homemade explosives or explosives devices, and detect metallic weapons or parts of metallic weapons on personnel passing through a checkpoint without requiring the passengers to remove their footwear, and alert Transportation Security Officers (TSOs) with anomalies found on the personnel.

The scanner system of the present disclosure (herein "the scanner system") detects many types of concealment and anomalies using backscatter X-ray technology without requiring passengers to remove their footwear. The photon energy and intensity (kVp and mA) as well as the inspection time will be selected to maximize contrast so that a few percent difference in the effective atomic number $Z_{eff}$ and/or density p will be distinguishable.

With these settings, the scanner system generates a set of backscatter X-ray images of the footwear at several viewpoints. These images are processed by target recognition techniques to provide alerts to Transportation Security Officers (TSO). If no concealments/anomalies are found, then the passenger is cleared to go. However, if a knife is found, for instance, the boundary outlining the knife on the image of the shoes will be presented to the TSO as an alert for further scrutiny.

Thus, the scanner system may include the following steps:

(1) Generation of backscatter X-ray images of the footwear at several viewpoints (2) Target recognition of concealments for a binary decision of either: clear or reject Once the scanner processing is completed, the TSO is alerted with such findings. Each suspect region will clearly be delineated on the screen with a distinctive annunciation of each suspect region, e.g., liquid, explosive, weapon or anomaly.

The performance of the scanner system may be measured in terms of the receiver operating characteristic (ROC) curve using two sets of scanner data: with and without anomaly/threats. The operating points may be determined and thus the ROC curve can be found with the two sets of scanner data. The performance of the scanner system can then be compared with that of other scanner systems based on this ROC curve as well as to that of the TSO performance.

Thus, the scanner system may be characterized with the following:

Dual energy backscatter X-ray scanner system with target recognition.

ROC curve for the proposed system.

In one embodiment, the scanner system may be a stand-alone system with the inspection time of about three seconds. The scanner system may also be integrated with the existing advanced imaging technology with some interface work.

As mentioned above, existing sensing technologies are vulnerable and may miss the detection of many concealments or concealed objects inside a shoe. However, X-ray is the sensing technology that may detect almost all concealed threats and anomalies in a worn shoe. Thus, a Dual Energy scanner system based on backscatter X-ray technology is proposed, provided and described herein, Recently, the development of an integrated body and shoe scanning device using X-rays has been announced. The system utilizes X-rays, with a dedicated foot view in addition to the usual frontal and rear body views. The system appears to provide transmission X-ray images of the footwear. Generation of transmission X-ray images with a high enough contrast to discern various concealments would need to expose the entire foot to unnecessarily high dosages of X-ray radiation in order to penetrate the entire foot. As the present disclosure does not need to image the entire 3-D volume of the foot, backscatter X-rays are used in the present disclosure and in the scanner system just enough to penetrate only the footwear (and not the foot) at several different viewpoints.

Backscatter X-ray imaging principles have been successfully used in personnel scanners, currently referred to as advanced imaging technology scanners, for instance, Rapiscan's Single Pose Secure 1000 AIT, currently on the Department of Homeland Security Qualified Product List (AIT QPL, 2009). As the basic principle of the scanner system is highly relevant to the existing backscatter X-ray systems, a brief review of backscatter X-ray imaging systems will be provided below.

Backscatter X-ray imaging systems are based on two key components: (1) formation of the pencil beam and (2) the capturing of backscatter X-rays for imaging. The pencil beam can be formed with a horizontal slit collimator followed by a rotating disc with radial slits for raster scanning or by a pair of opposing spiral slits that rotate.

For personnel imaging, raster scanning of the pencil beam and the backscatter detection has been integrated. An improved version of this original design with more detectors at the side and behind the object has also appeared, with little deviation from the raster scanning of the pencil beam and backscatter detection. Recently, a system with several improvements such as tapered slits for pencil beam formation and a detector panel that moves with the X-ray source to maximize the captured number of photons has been proposed. Here, the dual energy is achieved by modulating the peak voltage.

Analysis of the basic backscatter X-ray imaging systems shows a definite relationship between the number of detected photons and the effective atomic number $Z_{eff}$. To be more precise, the mass attenuation length $M(Z_{eff}, L)|_{L=\infty}$, which can be computed via the X-ray measurement, can be parameterized as shown below (Rand 2010), where a, b and p are constants to be determined, E is the photon energy, and L is the penetration depth assumed to be large:

$$M(Z_{eff}, E, L)|_{L=\infty} = \frac{a}{1 - 2(E/mc^2) + (26/)(E/mc^2)^2 + b(E/mc^2)^{-3}(Z_{eff}/137)^p}$$

FIG. 1 illustrates mass-attenuation lengths for different X-rays at different electron effective atomic numbers, according to an embodiment of the present disclosure. Specifically, FIG. 1 shows calculated values for the quantity of the mass attenuation length, $M(Z_{eff}, E, L)$, for various body tissues and tissue equivalent plastics and an arbitrary group of other materials such as polyethylene, TNT, KCN, water, aluminum and iron. What is also shown here is the ratio of $M(Z_{eff}, E, L)$ at two different energies which illustrates the possibility of converting high and low energy measurements to the effective atomic number $Z_{eff}$. FIG. 1 also illustrates, for example, the mass attenuation lengths for X-rays at 20, 30, and 50 keV for different effective atomic numbers. Also shown are the ratios of mass attenuation lengths at 20 and 30 keV and at 50 and 30 keV.

FIG. 2A illustrates a rendered isometric view picture of the scanner system with a test subject, according to an embodiment of the present disclosure. Scanner 200 includes test subject 202, x-ray tubes 204, and feet detection area 206. Scanner 200 may include at least three x-ray tubes 204 for the top front or front, bottom left or left and bottom right or right views, as shown in FIG. 2A. Feet detection area 206 is where the test subject 202 places his or her feet for detection and scanning by the scanner 200. In one embodiment, a bottom plastic scintillating detector 208 may be placed where the feet detection area 206 is. FIG. 2B illustrates a rendered isometric view picture of the scanner with plastic scintillating detectors, according to an embodiment of the present disclosure. In FIG. 2B, scanner 200 includes at least three plastic scintillating detectors 208, which are placed, for example, on three sides and the bottom of the scanner as shown in FIG. 2B. Panels of the plastic scintillating detectors 208 may be dual energy detectors (a cascade of low and high energy detector panels) in order to capture low and high energy photons, independently. As shown in the front plastic scintillating detector 208, a hole may be cut in the detector screen of a plastic scintillating detector 208 in order to allow x-rays to pass through. FIGS. 2C, 2D and 2E illustrate the scanning perspective of the x-ray tubes of the scanner, according to an embodiment of the present disclosure. In one embodiment, the three views shown in FIGS. 2C, 2D and 2E inspect surfaces of the footwear when the feet of the test subject 202 are placed in the feet detection area 206 from the perspectives of the three x-ray tubes 204 shown in FIGS. 2A and 2B.

The operation of the scanner 200 begins as the test subject 202 steps onto the floor of the scanner and places his or her feet into the feet detection area 206, as shown in FIG. 2A. The imaging will be performed in series where one x-ray tube 204 may be on at a time. As such, the frontal view will be imaged by the front x-ray tube 204 where the backscatter x-rays will be captured by the front detector panel of the front plastic scintillating detector 208, as shown in FIG. 2B. At the time the front x-ray tube 204 emits x-rays, there may be some transmission photons and they may be detected by the bottom detector panel of the plastic scintillating detectors 208. In addition, detector panels of the plastic scintillating detectors 208 on the side walls may also detect some scattered photons. After the front x-ray tube 204 finishes, the process repeats for the left and right x-ray tubes 204. In the end, at least three x-ray tubes 204 collect four pairs of images each (high/low energy and transmission/scatter) resulting in a total of at least twelve images.

In one embodiment, the subject consisting substantially of $H_2O$ (for example, the feet of the test subject 202 or the test subject 202) is illuminated (pencil beam) with a 70 keV mean energy X-ray source. With the detector coverage of approximately 4 steradians (as estimated from the scanner design model), the percentage of incident photons that backscatter can be computed to be $PBS(H_2O)=0.14$. Similarly, for a typical organic material with an effective atomic number Z=6.5 and a density p=1 g/cc, $PBS(organic)=0.17$.

For a 3 cm thick plastic scintillating detector panel, it is estimated that about 80% of the incident photons will be absorbed. In a dual energy configuration where two detector panels are cascaded, the first panel may be configured to detect about 40% of the incident photons, mostly of lower energy photons. Thus, we set the detector efficiency of the low energy detector panel to be η=0.4.

Accordingly, the absorbed radiation dose can be calculated as:

$$DOSE = \frac{E}{2.17 \times 10^{12}} \frac{N_{IP}}{A_{pixel}} \cdot 1 \times 10^{-2}$$

Where DOSE is in Sieverts, E is the average incident photon energy in keV, $N_{IP}$ is the number of X-ray photons incident on the subject per pixel, and $A_{pixel}$ is the area per pixel in $cm^2$.

The signal-to-noise ratio for the two materials can be written as:

$$SNR = \frac{\Delta I}{\sigma_D} = \frac{N_{D(org)} - N_{D(H2O)}}{\sqrt{N_D}}$$

Where $N_D = N_{IP}(P_{BS}\eta)$, the number of photons absorbed by the detector panel for the two materials, and bar indicates the average operation.

Figure 3:
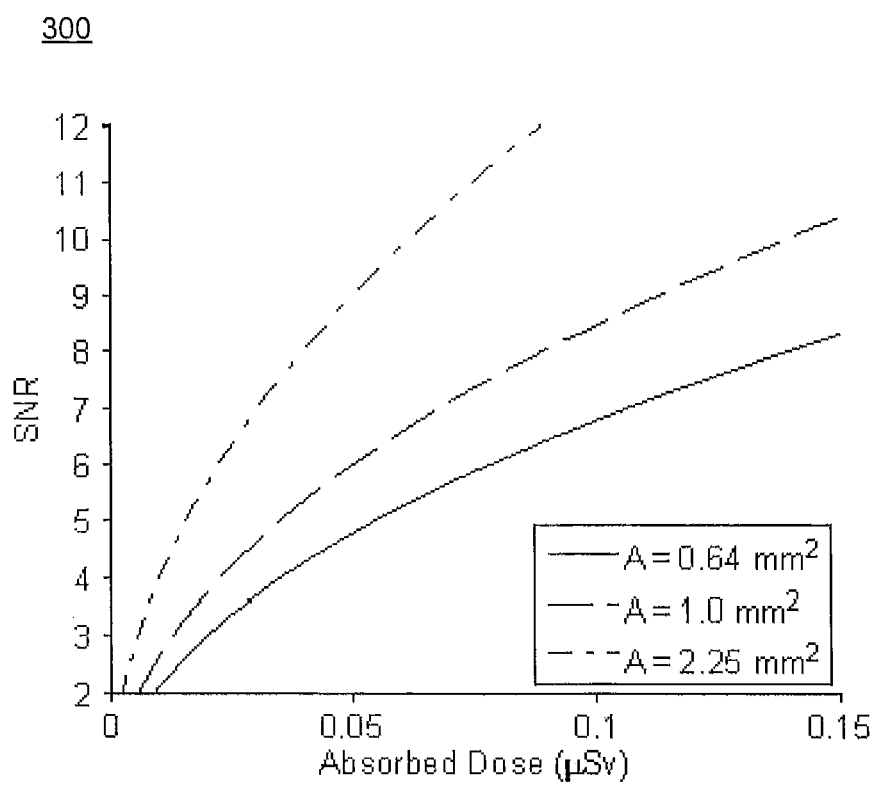
FIG. 3 illustrates plots of expected signal-to-noise ratios for the differentiation of two similar materials versus absorbed dose, according to an embodiment of the present disclosure.

FIG. 3 illustrates plots of expected signal-to-noise ratios for the differentiation of two similar materials versus absorbed dose, according to an embodiment of the present disclosure. Specifically, plot 300 shows the relationship between SNR (image quality) and absorbed dose for three different levels of pixel or spatial resolution, 0.64 $mm^2$, 1.0 $mm^2$ and 2.25 $mm^2$, as shown in FIG. 3. Each curve corresponds to a different pixel level or spatial resolution. The plot 300 also assumes an inspection time of 3 seconds (1 second per view) and 100 kVp. The tube current of about 2 mA corresponds to 0.05 μSv. The results of plot 300 indicate that acceptable noise characteristics for distinguishing between threat and non-threat organic materials can be achieved at high spatial resolution without exceeding the absorbed dose target of 0.25 μSv per scan as established by the ANSI standard. For instance, at 1.0 $mm^2$ pixel resolution, a SNR of 6 can be achieved at the dose of 0.05 μSv, which may be close to the dose used by current advanced imaging technology scanners.

Figure 4A:
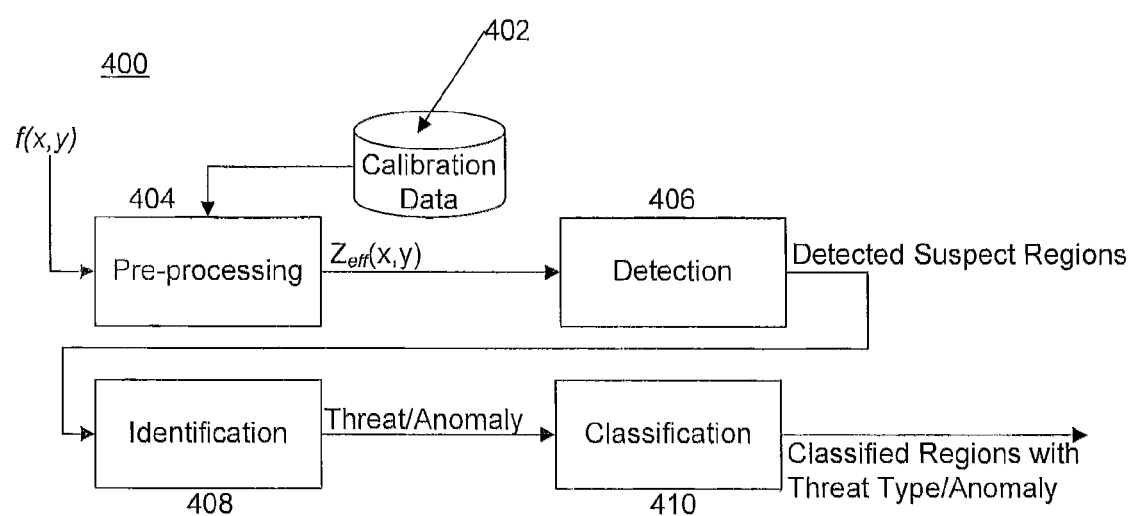
FIG. 4A illustrates a block diagram of a system that performs the overall target recognition processing, according to an embodiment of the present disclosure.

FIG. 4A illustrates a block diagram of a system that performs the overall target recognition processing, according to an embodiment of the present disclosure. Target recognition system 400 includes calibration data 402, pre-processing block 404, detection block 406, identification block 408 and classification block 410. The input scanner image to the pre-processing block 404 is f(x,y) (also input to the pre-processing block 404 is the data from calibration data 402) and the output of the pre-processing block 404 is the atomic number image $Z_{eff}(x,y)$. The detection block 406 performs processing which segments or detects suspect regions, and the identification block 408 performs processing which identifies each detected suspect region as an object class, the object class including, for example, threat, benign or anomaly. The classification block 410 performs processing which categorizes each detected object class by threat or anomaly type, such as, for example, weapons, explosives or liquids. Additional categories may be added or changed.

Accordingly, in one embodiment, the target recognition processing includes the following four major software blocks: pre-processing block 404, detection block 406, identification block 408, and classification block 410.

The pre-processing performed by the target recognition system 400 calibrates the scanner image data as generated by the scanner using calibration data 402, which is inputted into the pre-processing block as f(x,y). This involves normalization of the x-ray data as well as some registration processing between at least three views shown, for example in FIGS. 2C-2E. The X-ray data is first normalized so that the dependency of the intensity measurement on distance does not play a role in the processing to follow. The normalized dual energy intensity measurements are then used to construct the $Z_{eff}$ image using a look-up-table. Here, the registration of the three views, i.e., the pixel-to-pixel correspondence among the views are established to aid the processing to follow.

The scanner system may use developed target recognition techniques for various modalities of security imaging, namely, explosive detection system (EDS) and Tip-Ready X-ray scanners. The detection block 406 may use such advanced image processing techniques, which have been implemented for these modalities, including but not limited to, Histogram-based Segmentation, Segmentation by K-means Clustering, Watershed Segmentation, Region Growing, Labeling by Connectivity and Morphological Filters. These segmentation techniques work in a collaborative fashion where the segmentation result is a mask where suspect threat regions are identified. This can be detected, for instance, by delineating regions where the effective atomic number, $Z_{eff}$ differs from that of the shoe by a pre-established threshold. The threshold can be set based on the optimum operating point on the ROC curve.

In the identification block 408, each of the detected suspect regions will be identified as an object class, the object class including threats, anomalies or benign, and the object class determination being based on available attributes, such as shape, size as well as the local mean, variance and texture data of the detected region. These attributes as well as others will be used to identify the suspect region more precisely. Further, the $Z_{eff}$ (X-ray backscatter) of the detected region will be computed, which will further aid the identification process. For instance, if $Z_{eff}$ of the suspect region is close to that of steel, then the technique would declare that region to be metallic weapon.

In the classification block 410, identified object class may be scrutinized further for additional classification. The following classes may be used by the scanner system: liquids, explosives, weapons, benign, and anomalies. The classification decision may be based on available previously-computed attributes, such as the attributes used by the identification block 408, for example, shape, size, local mean, local variance and texture. Previously computed $Z_{eff}$ or reflectivity values may also be utilized to obtain more accurate classification results. The output of this final step of the target recognition processing is the classification of each object class as, for example, a liquid, explosive, weapon, benign or anomaly. The categories used to classify the threats may also be modified and are changeable. For instance, additional categories may be added, edited, revised or removed according to varying security threats that occur at different times from a revolving set of categories used to classify threats in classification block 410.

Figure 4B:
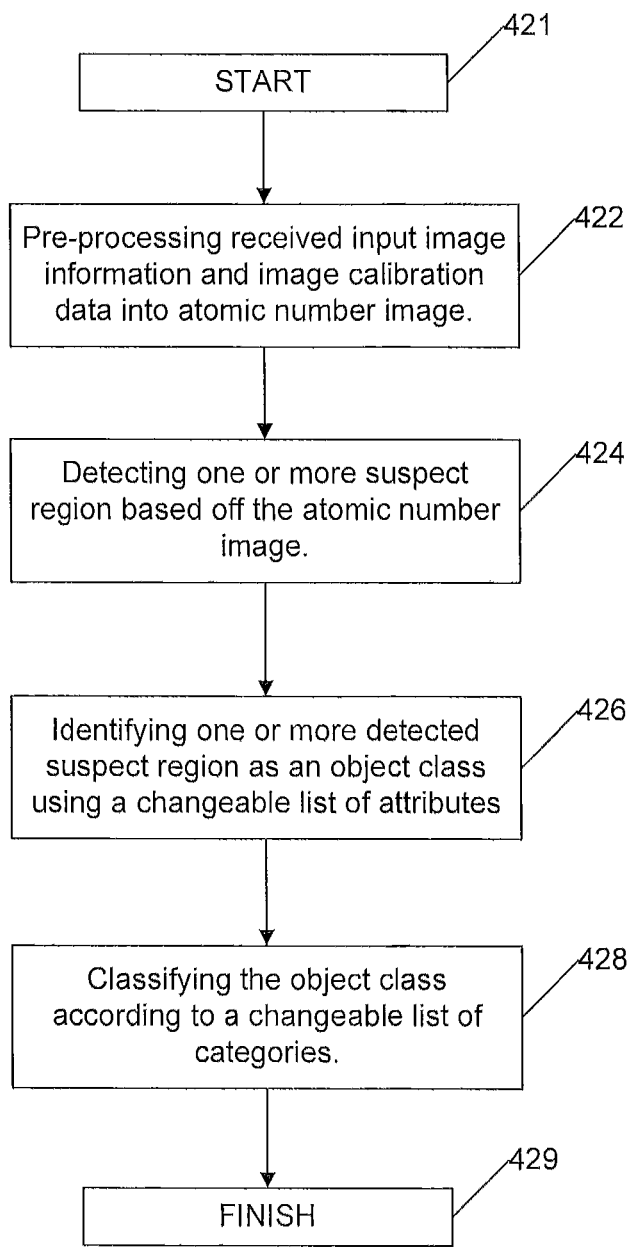
FIG. 4B illustrates a flowchart of a method that performs the overall target recognition processing, according to an embodiment of the present disclosure.

FIG. 4B illustrates a flowchart of a method that performs the overall target recognition processing, according to an embodiment of the present disclosure. Process 420 is a method to perform target recognition processing and starts in step 421. In step 422, the act of pre-processing input image information and image calibration data into an atomic number image is performed. The input image information is taken from the scanning device in the form of a f(x,y) signal, and the image calibration data may be taken from an image calibration database that stores for example, techniques from an image segmentation library as discussed above. The output of step 422 is an atomic number image or the $Z_{eff}$ calculated from backscatter X-rays.

In step 424, the act of detecting at least one suspect region based off the atomic number image is performed. The suspect regions can be detected using a number of different image detection and processing techniques taken from the image segmentation library such as, for example, Histogram-based Segmentation, Segmentation by K-means Clustering, Watershed Segmentation, Region Growing, Labeling by Connectivity and Morphological Filters. The detected suspect regions are usually delineated by means of contours or dotted-lines or other such related boundaries.

In step 426, the act of identifying the at least one detected suspect region as an object class using a changeable list of attributes is performed. The object class may include whether an object is a threat, an anomaly or benign. The changeable list of attributes used to make the object class determination may be, for example, shape, size, local mean (average or mean intensity of a local region), variance and texture data of the detected region. Further, the $Z_{eff}$(X-ray backscatter) of the detected suspect region which was computed in step 422 will further aid the identification process if used. The knowledge of effective atomic number $Z_{eff}$ allows the determination of material characteristics, whether the material is similar to organic (plastic), Aluminum, or Steel.

In step 428, the act of classifying the object class according to a changeable list of categories is performed. After the object class is identified in step 426, the object class may then be scrutinized further for additional classification according to a changeable list of categories. For instance, categories to be used to classify the object class may include, for example, whether the object class is a liquid, explosive, weapon, benign, and anomaly. The classification decision may also additionally be based on available previously-computed attributes such as the attributes from step 426 such as, for example, shape, size, local mean, local variance and texture. Previously computed $Z_{eff}$ or reflectivity values may also be utilized in the classification process to obtain a more accurate result. The output of this final step of the target recognition processing is the classification of each identified object class as, for example, a liquid, explosive, weapon, benign or anomaly. Again, the changeable list of categories used to classify the object class may also be modified and may be changeable. For instance, additional categories may be added, edited, revised or removed according to varying security threats that occur at different times from a revolving and dynamic set of categories. In step 429, the process 420 finishes, but may be repeated again, and repeated again starting from any of the previously mentioned steps.

Figure 5:
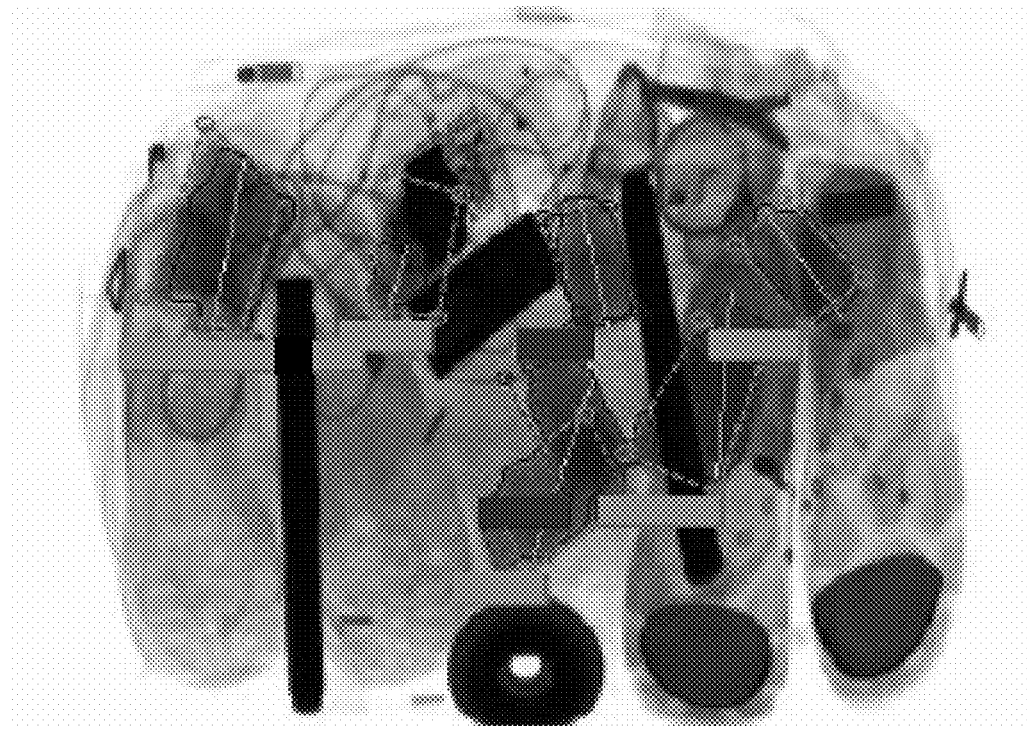
FIG. 5 illustrates image segmentation result generated by the image segmentation library, according to an embodiment of the present disclosure.

FIG. 5 illustrates an image generated by the image segmentation library, according to an embodiment of the present disclosure. As one example of the efficacy of the image segmentation library, contours in one color (e.g., solid blue) may depict the detected liquid regions, and dotted lines may depict the manually entered "ground truth" which serve as reference points. In FIG. 5, concealed liquid items in a highly cluttered carry-on luggage have been detected using the data from a single-view dual energy tip-ready scanner, for example.

According to the scanner system of the present disclosure, sensing technology, such as the x-ray, allows the detection of concealments in footwear. The scanner system of the present disclosure is one of the systems based on this technology, in terms of using the lowest possible dose without degrading performance. FIG. 3 reveals a way to find a dose which is low enough and yet provides the necessary SNR for detection of the concealments. Thus, the scanner system is a low dose X-ray system that generates images with high enough SNR that enables the target recognition software to perform with a high probability of detection while maintaining a low probability of false alarm. Increasing the probability of detection and decreasing the probability of false alarm expedites the screening process and thus increases passenger throughput.

According to the scanner system of the present disclosure, a dual energy backscatter X-ray based scanner may be constructed with a target recognition software solution. The automation of target recognition allows the scanners to be operated as a metal detector with a green/red light for clear/alarm notifications, which substantially reduces any human intervention.

One implementation includes one or more programmable processors and corresponding computer system components to store and execute computer instructions. Additional variations and implementations are also possible.

Those of skill will appreciate that the various illustrative logical blocks, modules, units, and technique steps described in connection with the embodiments disclosed herein can often be implemented as electronic hardware, computer software, or combinations of both. To clearly illustrate this interchangeability of hardware and software, various illustrative components, units, blocks, modules, and steps have been described above generally in terms of their functionality. Whether such functionality is implemented as hardware or software depends upon the particular system and design constraints imposed on the overall system. Skilled persons can implement the described functionality in varying ways for each particular system, but such implementation decisions should not be interpreted as causing a departure from the scope of the invention. In addition, the grouping of functions within a unit, module, block or step is for ease of description. Specific functions or steps can be moved from one unit, module or block without departing from the invention.

The various illustrative logical blocks, units, steps and modules described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or technique and the processes of a block or module described in connection with the embodiments disclosed herein can be embodied directly in hardware, in a software module (or unit) executed by a processor, or in a combination of the two. A software module can reside in RAM memory, flash memory, ROM memory, EPROM memory, EEPROM memory, registers, hard disk, a removable disk, a CD-ROM, or any other form of machine or computer readable storage medium. An exemplary storage medium can be coupled to the processor such that the processor can read information from, and write information to, the storage medium. In the alternative, the storage medium can be integral to the processor. The processor and the storage medium can reside in an ASIC.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter, which is broadly contemplated by the present invention. It is further understood that the scope of the present invention fully encompasses other embodiments that may become obvious to those skilled in the art.

The invention claimed is:

1. A shoe scanning device, comprising:
   three or more x-ray tubes oriented towards a footwear of a test subject and configured to emit at least one beam of x-rays toward the footwear of the test subject at less than 100 kilo electron volts (keV), the x-ray tubes being arranged evenly about the footwear;
   at least one detector panel disposed adjacent to each of the x-ray tubes and oriented towards the footwear of the test subject, the at least one detector panel configured to detect photons from the x-rays that are scattered following impact with the footwear,
   wherein the at least one detector panel comprises a high energy detector and a low energy detector arranged in a cascade, the low energy detector arranged in front of the high energy detector, the low energy detector configured to absorb forty percent of the incident radiation, each detector panel being configured to independently capture both low and high energy photons;
   a storage unit coupled to the at least one detector panel configured to store images generated from scattered photons detected on the at least one detector panel; and
   a processing unit coupled to the storage unit having software to detect, identify and classify concealed objects in a selected area of the test subject.

2. The shoe scanning device of claim 1, wherein the at least one detector panel comprises a front panel, a right panel, a left panel and a bottom base detector panel, and each of the three x-ray tubes will collect four images each: high energy, low energy, transmission image and scatter image.

3. The shoe scanning device of claim 1, wherein the processing unit comprises:
a database to store image calibration data;
a pre-processing unit to receive image data from the storage unit and image calibration data from the database to output an atomic number image;
a detection unit to detect suspect regions from the atomic number image;
an identification unit to identify whether the suspect regions are threats or anomalies based on a changeable list of attributes and information from the atomic number image; and
a classification unit to classify the identified threats or anomalies based on a changeable list of categories, the changeable list of attributes and the information from the atomic number image.

4. A system comprising:
a database to store image calibration data;
a shoe scanning device comprising three or more x-ray tubes oriented towards a footwear of a test subject and configured to emit at least one beam of x-rays toward the footwear of the test subject at less than 100 kilo electron volts (keV), the x-ray tubes being arranged evenly about the footwear, and at least one detector panel disposed adjacent to each of the x-ray tubes and oriented towards the footwear of the test subject, the at least one detector panel configured to detect photons from the x-rays scattered following impact with the footwear,
wherein the at least one detector panel comprises a high energy detector and a low energy detector arranged in a cascade, the low energy detector arranged in front of the high energy detector, the low energy detector configured to absorb forty percent of the incident radiation, wherein each detector panel is configured to independently capture both low and high energy photons;
a pre-processing unit to receive and process image data from the shoe scanning device and to receive image calibration data from the database to output an atomic number image;
a detection unit to detect at least one suspect region from the atomic number image;
an identification unit to identify at least one object class from the at least one suspect region based on a changeable list of attributes and information from the atomic number image; and
a classification unit to classify the at least one object class based on a changeable list of categories.

5. The system of claim 4, wherein the pre-processing unit comprises:
a normalizing unit to normalize the received image data with respect to the received image calibration data; and
a registration processing unit to perform registration processing on the received input image information between all the views of the at least one x-ray tube and the at least one detector panel of the shoe scanning device.

6. The system of claim 4, wherein the detection unit comprises an image segmentation library comprising a histogram-based segmentation technique, a segmentation by K-means clustering technique, a watershed segmentation technique, a region growing technique, and a labeling by connectivity and morphological filters technique, and wherein the detection unit uses at least one technique from the image segmentation library.

7. The system of claim 4, wherein the changeable list of attributes used by the identification unit comprises shape, size, local mean, variance, and texture data of the detected suspect regions.

8. The system of claim 4, wherein the changeable list of categories used by the classification unit comprises liquids, explosives, weapons and anomalies.

9. The system of claim 8, wherein the classification unit utilizes the changeable list of attributes used by the identification unit and information from the atomic number image to better classify the identified threats or anomalies according to the changeable list of categories.

* * * * *